US009257905B1

(12) United States Patent
Kotikalapoodi

(10) Patent No.: US 9,257,905 B1
(45) Date of Patent: Feb. 9, 2016

(54) METHOD AND APPARATUS FOR POWER SUPPLY WITH FAST TRANSIENT RESPONSE

(71) Applicant: Sridhar Kotikalapoodi, Sunnyvale, CA (US)

(72) Inventor: Sridhar Kotikalapoodi, Sunnyvale, CA (US)

( * ) Notice: Subject to any disclaimer, the term of this patent is extended or adjusted under 35 U.S.C. 154(b) by 203 days.

(21) Appl. No.: 14/070,503

(22) Filed: Nov. 2, 2013

(51) Int. Cl.
*H02M 3/156* (2006.01)
*H02J 7/00* (2006.01)
*H05B 37/02* (2006.01)

(52) U.S. Cl.
CPC .............. *H02M 3/156* (2013.01); *H02J 7/008* (2013.01); *H02J 7/0072* (2013.01); *H02J 7/0086* (2013.01); *H05B 37/02* (2013.01); *H02M 2003/1566* (2013.01)

(58) Field of Classification Search
CPC ............. H02M 3/156; H02M 3/1563; H02M 2003/1566; H02M 3/1582; H05B 37/02; H02J 7/0072; H02J 7/007; H02J 7/0075; H02J 7/0077; H02J 7/008; H02J 7/0081; H02J 7/0083; H02J 7/0085; H02J 7/0086
See application file for complete search history.

(56) References Cited

U.S. PATENT DOCUMENTS

| 5,337,284 | A * | 8/1994 | Cordoba et al. | 365/227 |
|---|---|---|---|---|
| 5,877,651 | A * | 3/1999 | Furutani | 327/538 |
| 6,128,242 | A * | 10/2000 | Banba et al. | 365/226 |
| 6,239,509 | B1 * | 5/2001 | Rader et al. | 307/11 |
| 6,285,622 | B1 * | 9/2001 | Haraguchi et al. | 365/226 |
| 6,414,881 | B1 * | 7/2002 | Fujii et al. | 365/189.09 |
| 2007/0268064 | A1 * | 11/2007 | Takeyama et al. | 327/536 |
| 2012/0169411 | A1 * | 7/2012 | Fefer et al. | 327/538 |
| 2014/0159683 | A1 * | 6/2014 | Pan et al. | 323/280 |

* cited by examiner

*Primary Examiner* — Jung Kim
(74) *Attorney, Agent, or Firm* — Heimlich Law, PC; Alan Heimlich, Esq.

(57) ABSTRACT

An efficient power supply with fast transient response has been disclosed. In one implementation, two loops with different frequency responses are combined to provide an efficient, fast responding power supply.

12 Claims, 7 Drawing Sheets

METHOD AND APPARATUS FOR POWER SUPPLY WITH FAST TRANSIENT RESPONSE

FIELD OF THE INVENTION

The present invention pertains to power supplies. More particularly, the present invention relates to Method and Apparatus for Power Supply with Fast Transient Response.

BACKGROUND OF THE INVENTION

A fast transient response power supply is needed for many electronic devices. For example, the RF (Radio Frequency) Power Amplifier in a mobile phone has a load profile which includes a burst of high current followed by a quiet period and if powered directly from a battery, the battery supply voltage because of its internal resistance ESR (equivalent series resistance) exhibits a voltage dip (drop) during the bursts of high current. The resulting voltage may not be high enough to power the RF power amplifier. This presents a technical problem for which a technical solution using a technical means is needed.

BRIEF DESCRIPTION OF THE DRAWINGS

The invention is illustrated by way of example and not limitation in the figures of the accompanying drawings in which.

DETAILED DESCRIPTION

In one embodiment of the invention, without increasing the switching frequency of the main switch mode power supply which increases switching losses and hence decreases the efficiency is provided a fast responding power supply.

In one embodiment of the invention, a load is powered by a parallel combination of a battery and a step-up regulator thus a more efficient power supply than just using a step-up regulator is provided.

In one embodiment of the invention, a power supply with a parallel second regulator having a faster (higher) frequency response that prevents the output voltage, which is higher than its supply voltage, from dropping is provided.

In one embodiment of the invention, a faster response power supply, for example, to power an LED string, rather than a pure switch mode power supply is provided. Thus a power supply which enables a higher dimming ratio for the LEDs (via current control) than a pure switch mode power supply is provided.

Figure 1:
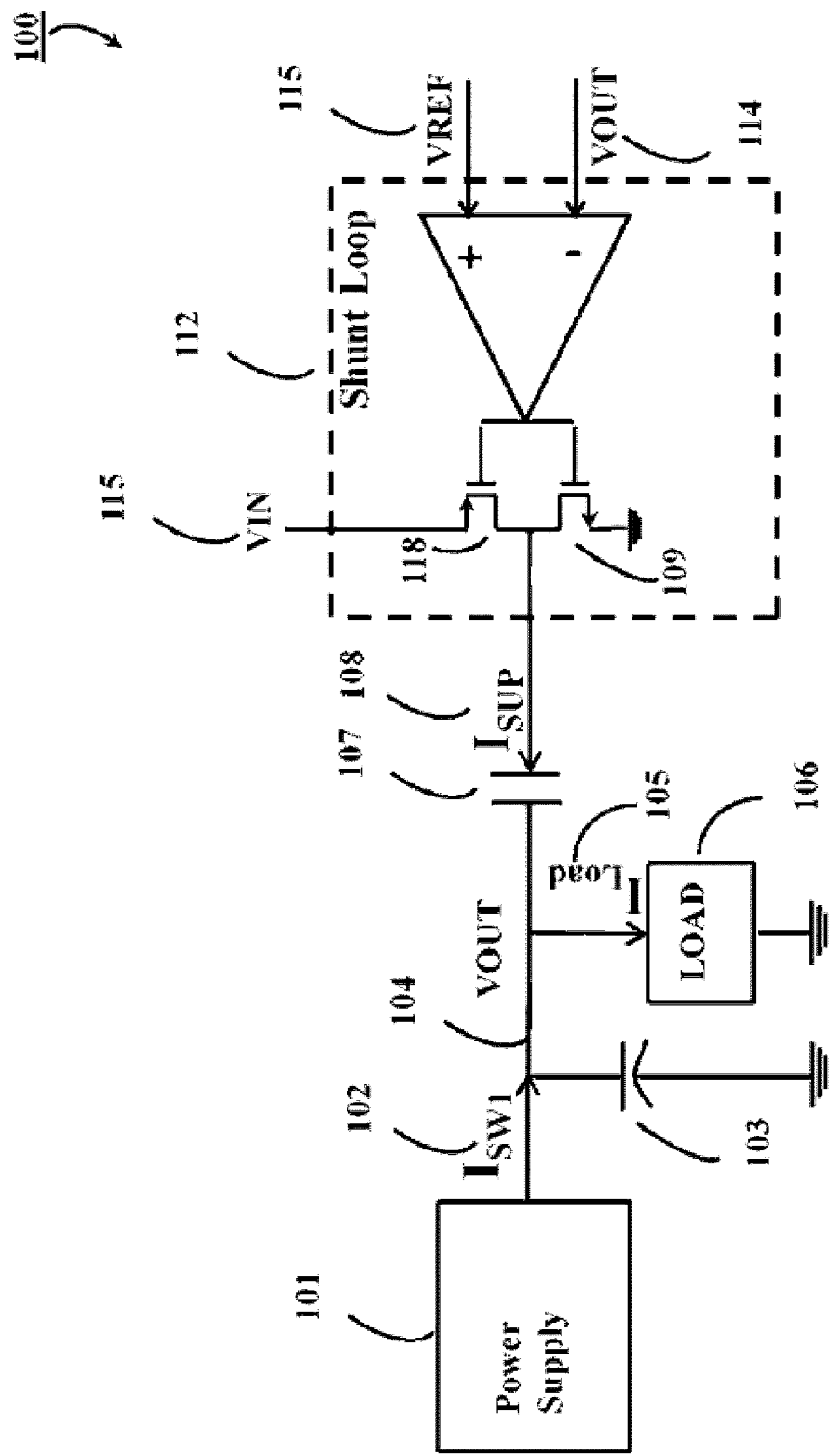
FIG. 1 illustrates one embodiment of the invention.

FIG. 1 illustrates, generally at 100, one embodiment of the invention. The power supply system 100 includes a power supply 101 (also called a primary regulator) which generates VOUT 104 and under steady state condition provides the needed load current $I_{Load}$ 105 to the load 106. Without limitation, as an example, the power supply 101 could be a power source like a battery or a DC-DC voltage regulator. Since the power supply provides the steady state load current $I_{Load}$ 105 to the load 106, it is generally optimized for efficiency in steady state conditions. As an example, if the power supply 101 is a switch mode regulator, its bandwidth may be limited and hence it is slow responding as increase in its switching frequency to improve bandwidth will decrease its efficiency due to increased switching losses. In general, the load 106 is an electronic load and is varying dynamically. As an example, the load 106 could be a light emitting diode (LED) string and the LED string is turned on and off periodically for dimming the light emitted, thus causing a load transient event at the node VOUT 104. Because the power supply 101 is optimized for efficiency and slow responding, during this load transient event, the increased load at VOUT 104 may cause VOUT voltage to decrease before power supply 101 can respond. This drop in VOUT voltage 104 may cause improper operation of the electronic device, LED string in the example, due to insufficient voltage. To prevent the VOUT voltage 104 from dropping down below a threshold voltage, a secondary parallel (shunt) loop or regulator 112 (shunt loop, or secondary loop, or secondary regulator) monitors the voltage at VOUT 104 through a feedback network at 114 and compares it with a reference voltage VREF 115. In the steady state operation, VOUT (104 and 114) is higher than the reference VREF (115), causing the shunt loop to turn on the low side device switch 109. The low side device 109 pulls the node 108 to ground potential. Node 108 is at the junction of low side device 109 and high side device 118. Since one side of the capacitor 107 is connected to VOUT 104 and the other side 108 is pulled to ground, the capacitor 107 is charged to the voltage at the node VOUT 104 in the steady state. When the load current $I_{Load}$ 105 increases during a transient event, the voltage at VOUT 104 starts to decrease. The secondary loop 112 monitors this and turns off the low side device 109 and turns on the current source device 118 (high side device) which pulls up the voltage at the node 108. Since a capacitor has lower impedance at high frequencies, and VOUT 104 is connected to the node 108 through the capacitor 107, any increase in the voltage at node 108 will couple to VOUT 104 and prevents it from dropping. Thus, the secondary loop 112 provides increased current in the load 106 by supplementing the current $I_{SW1}$ 102 provided by the primary power source 101 with $I_{SUP}$ 108 through the capacitor 107.

Since in the steady state the voltage at VOUT 104 is higher than the voltage VREF 115, the current source device 118 is turned off by the shunt loop 112 and the node 108 is pulled low and the capacitor 107 is charged to the voltage at VOUT 104 and is high impedance and acts as open, thus the secondary loop 112 becomes inactive in the steady state and doesn't provide any load current. Therefore, the secondary loop 112 could be optimized for speed rather than efficiency; as an example, implementing it as a linear regulator. Linear regulators can be made faster than switching regulators as they don't have the switching frequency filters like inductors in the loop. As another example, the secondary loop 112 could be implemented as a switching regulator with its switching frequency higher than that of the power source 101 and optimized for faster response.

If the secondary loop 112 is connected to VOUT 104 directly without the capacitor 107, the power supply 100 may not work properly. As an example without limitation, if the load 106 is a backlight white LED string of a mobile device connected in series, the VOUT voltage 104 could be as high as 16V to 40V depending on the number of white LED devices in series. During a load transient event, in order for the secondary loop 112 to source current to VOUT 104, if its output 108 were connected to VOUT 104 without the capacitor 107, the voltage of the supply VIN 115 connected to the current source device 118 of the secondary loop 112 needs to be higher than the voltage at VOUT 104 because current can only be sourced from a higher voltage to lower voltage; otherwise the device 118 will not be able to source any current to VOUT 104 to prevent it from decreasing. In a mobile device, voltage higher than the backlight LED supply voltage (16V to 40V for example) is generally not available. Inclusion of the capacitor 107 overcomes this problem.

In the steady state, node 108 is pulled to ground and the capacitor 107 is charged to the voltage VOUT 104. As a high frequency change at node 108 is coupled to VOUT 104 as a ratio of the coupling capacitance value (e.g. primarily 107) to the total capacitance value at the node VOUT, during a transient load event if the voltage at VOUT 104, for example, drops down by 500 mV, the secondary loop 112 needs to pull-up via 118 the voltage at node 108 by 500 mV* (CCOUP+CLOAD/CCOUP), where CCOUP is the capacitance value of the capacitor 107, and CLOAD is the capacitance value of the energy storage capacitor 103 (e.g. primarily, if present) at VOUT 104. If the capacitors 107 and 103, for example, have equal values, then to compensate for a 500 mV drop at VOUT, the voltage at the node 108 needs to be pulled up by 500 mV*2=1V. Since the voltage at the node 108 needs to be pulled up to 1V, the supply voltage VIN for the secondary loop source device 118 needs to be higher than just 1V in order to source supplemental current to load 106. Therefore VIN 115 could directly connect to the battery (typically a Lithium-ion battery at 3.7V) in the mobile device or one of the several step-down regulators typically present in the mobile device which step down the battery voltage to a lower voltage.

In addition, as the power delivered is the product of voltage and current (P=V*I), to supplement a given amount of load current at VOUT 104, for example, from a 40V supply as compared to from a 1V supply is 40 times less efficient. Thus connecting the secondary loop 112 through a capacitor 107 to VOUT 104 (which as an example, is regulated at 40V) and providing the source current $I_{SUP}$ 108, as an example, from a 1V supply rather than directly connecting secondary loop 112 to VOUT 104 without the capacitor 107 and without sourcing current from a 40V supply (i.e. using a 1V supply instead), makes it about 40 times more efficient.

Therefore the inclusion of the capacitor 107 overcomes technical issues and aids in presenting a feasible technical solution to the problem of providing an efficient power supply with a fast transient response.

Figure 2:
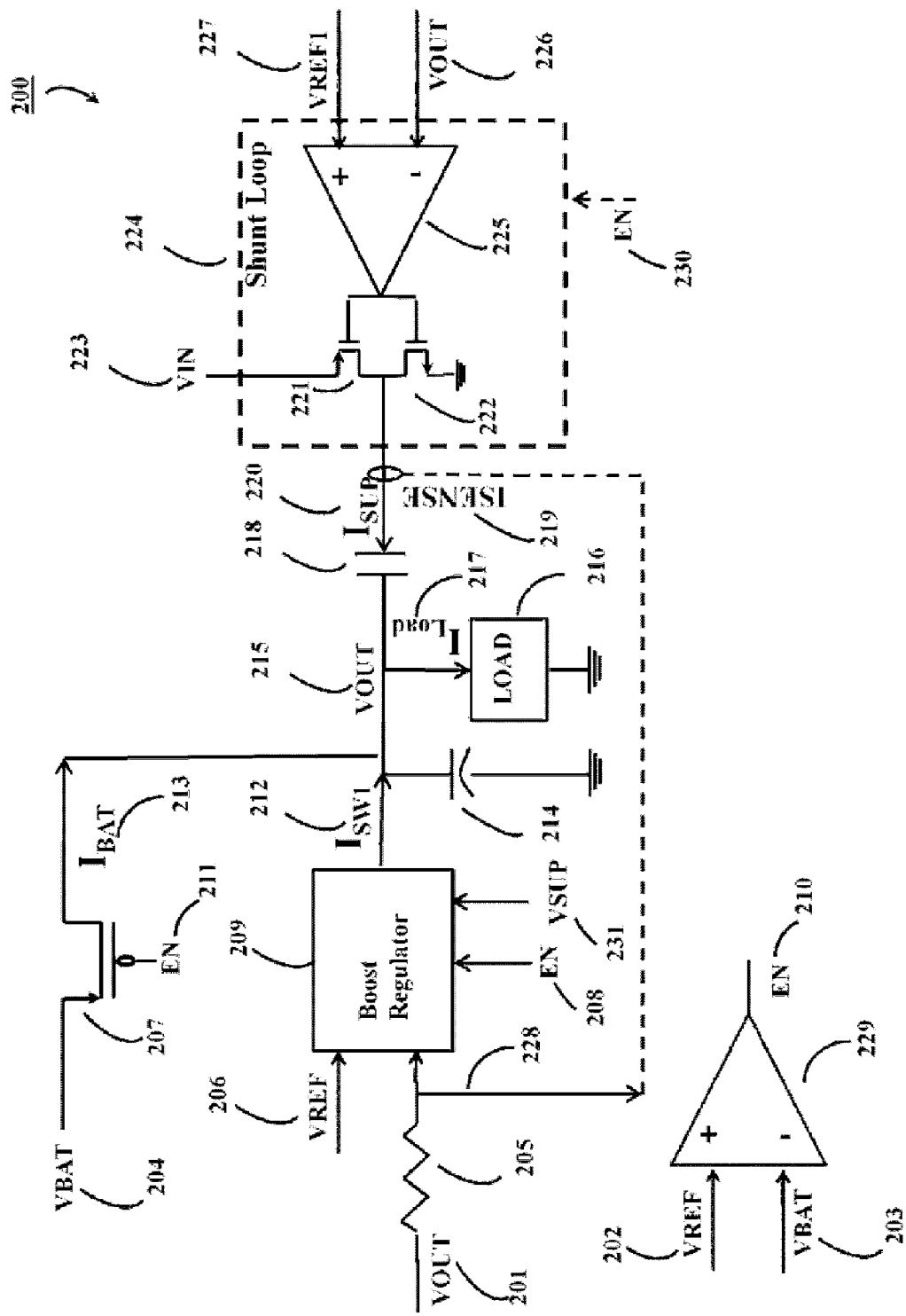
FIG. 2 illustrates an application using one embodiment of the invention.

FIG. 2 illustrates, generally at 200, another embodiment of the present invention showing a power supply. $I_{Load}$ 217 is for example, the load current pulled by an electronic device 216 (LOAD) at the node VOUT 215 (also shown at 201, 226). For proper operation of the electronic device 216, the voltage at VOUT 215 needs to be at least higher than a certain minimum value, as an example equal to VREF (202, 206). An example of the LOAD 216 could be a Radio Frequency (RF) power amplifier. To transmit an RF signal at required power, the RF power amplifier needs a minimum voltage and if the voltage is lower than this required minimum, the RF power transmitted will be less than the minimum required level causing reduction in or possibly the loss of the RF transmitted signal. VBAT 204 (also shown at 203) is the voltage output of the power source (battery) (example Li-ion battery). When the battery is fully charged, the voltage VBAT 204 may be higher than the required minimum voltage VREF 202 needed at VOUT and is coupled to VOUT 215 through the transistor switch 207. The comparator 229 senses that VBAT voltage 203 is higher than the minimum required voltage VREF 202, and pulls its output EN 210 low. This in turn causes the PMOS transistor switch 207 to turn on as its gate 211, connected to EN, is low. Thus, power source VBAT 204 supplies the needed load $I_{Load}$ 217 at VOUT 215 via $I_{BAT}$ 213. As the battery discharges, its voltage VBAT 204 decreases below the minimum required voltage VREF 202. The comparator 229 senses this and pulls EN 210 high, this in turn disables the transistor switch 207, thus disconnecting VBAT 204 from VOUT 215. In addition, EN 208 is coupled to the boost regulator 209 (also called a primary regulator). When EN 208 goes high, the boost regulator 209 is enabled, which takes the power source voltage VSUP 231 as an input, as an example VSUP 231 could be the same power source as VBAT 204 as input, and steps up or boosts it to a higher voltage at its output 212 to the required minimum voltage VREF 202.

There may be a time delay between disconnecting the VBAT 204 from VOUT 215 via transistor switch 207 and enabling boost regulator 209 which in turn starts to boost its output 212 high toward the required minimum voltage VREF 202. During this time, there could be a load transient at the output 215, with an increased load causing it to bring down the voltage at VOUT 215 resulting in system failure. In addition, the boost regulator 209 bandwidth may be limited and may be unable to respond to fast load transient events at VOUT 215, causing the voltage at VOUT 215 to undershoot the minimum required voltage VREF 202.

Figure 3:
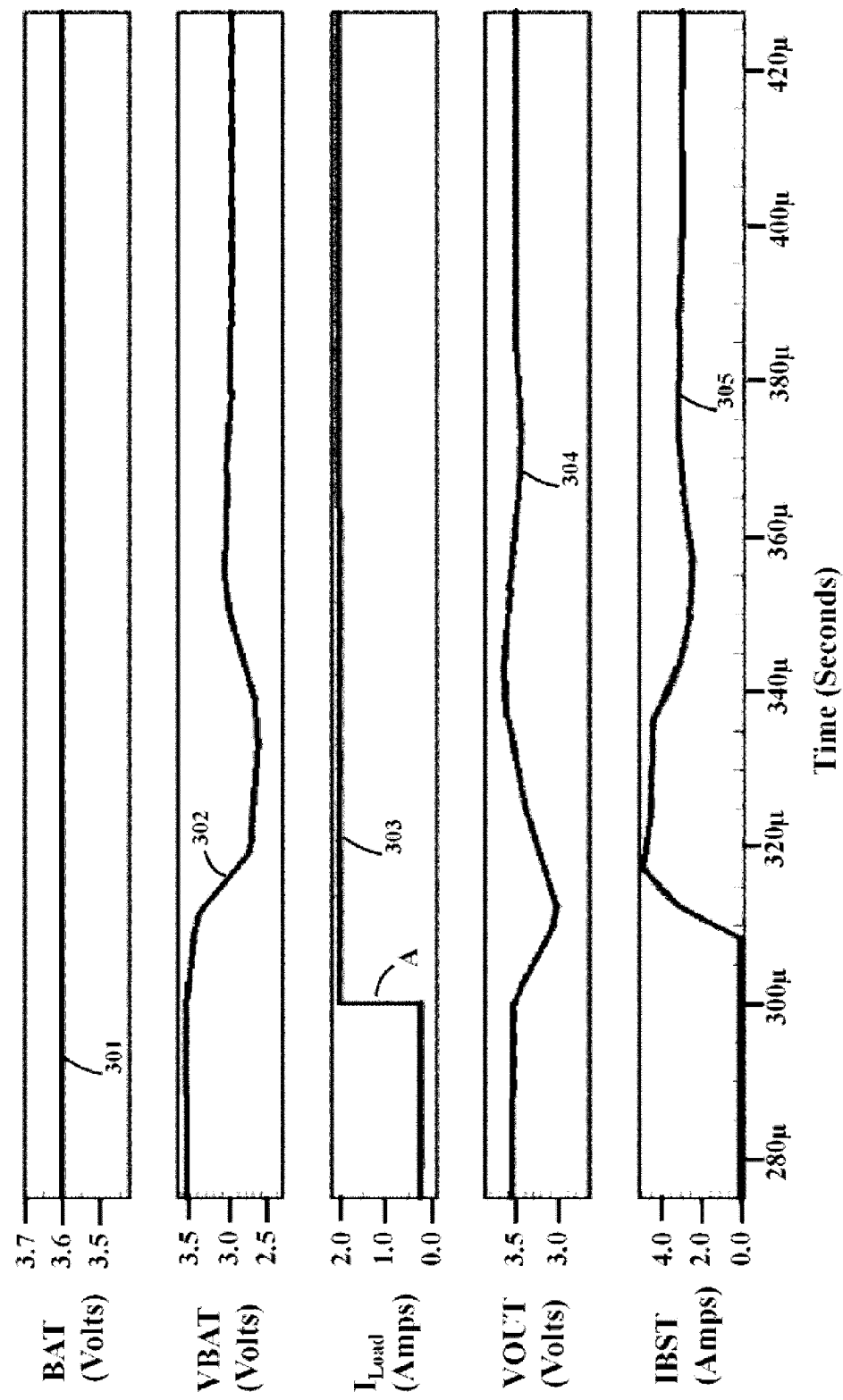
FIG. 3 illustrates waveforms that correspond to the operation of the circuit of FIG. 2.

FIG. 3 shows an example of simulated waveforms to further explain this load transient event. The first waveform 301 is the open circuit voltage of a power source at the node 204, i.e., the voltage at the power source's output terminals when there is no load present at its output. The power source, for example, a battery, has an internal resistance ESR (equivalent series resistance). When the power source is supplying current, the voltage at its output terminal is equal to the open circuit voltage (waveform 301) minus the ESR times the current being supplied. This voltage is shown in the waveform 302 and it is lower in value than the open circuit voltage 301 as the battery is supplying the load $I_{Load}$ 217 which is shown in waveform 303. Before the time point A, the load is 200 mA and VBAT 204 voltage is 3.55V, which is higher than the minimum voltage, as an example 3.5V, required at the output VOUT 215. At time point A, the load increases from 200 mA to 2 Amps. This increase in load causes the VBAT voltage to drop below 3.5V due to the increased current flowing through the internal resistance ESR. The comparator 229 senses this and turns off the transistor switch 207 and enables the boost regulator 209. Waveform 305 shows the current supplied by the power source VSUP 231. Due to the delay in the boost regulator ramping up its output current 212 $I_{SW1}$ and regulating the VOUT 215 to 3.5V, VOUT 215 drops to 3V as can be seen in the VOUT waveform 304, before boost regulator 209 can regulate it back to 3.5V. This drop in VOUT 215 below the minimum required voltage VREF 202 could cause system failure.

Figure 4:
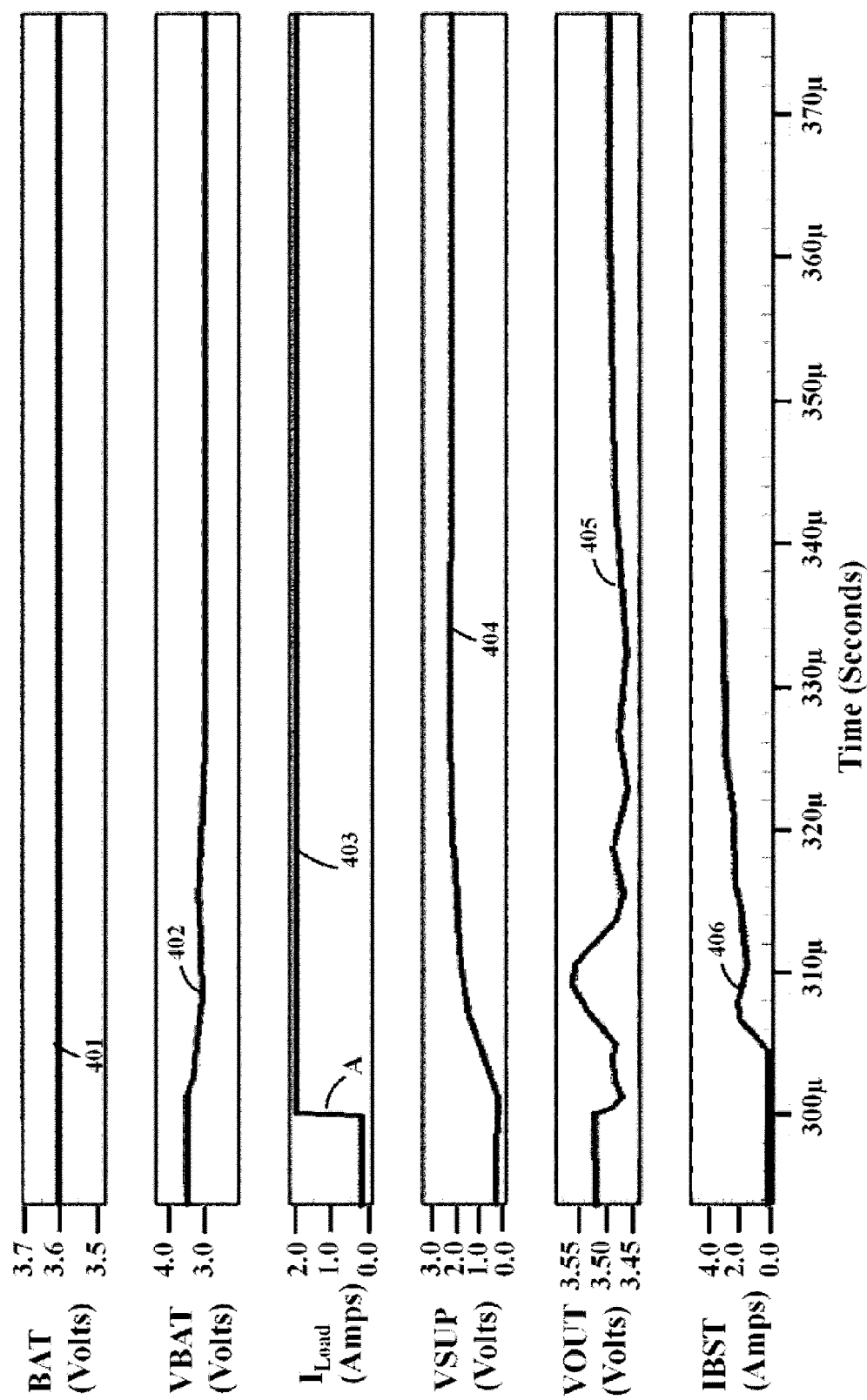
FIG. 4 illustrates waveforms that correspond to the operation of the circuit of FIG. 2.

The fast response secondary loop 224 (shunt loop or secondary regulator) which is coupled to the VOUT 215 through the capacitor 218 prevents VOUT 215 from dropping below the required minimum voltage. The waveforms of FIG. 4 show the load transient condition shown in FIG. 3 but with secondary loop 224 now active. 401 is the open circuit voltage of the power source at the node 204. 402 is voltage under load at the node 204, and 406 is the current supplied by the power source VSUP 231. Before time point A in the waveform 403, the load current is 200 mA similar to waveform 303 in FIG. 3 and VBAT voltage 402 is higher than the minimum voltage of 3.5V. The secondary loop has control signals VREF1 227 (in this case indicative of the minimum voltage 3.5V) and VOUT 226. Since before time point A, VBAT 204 and hence VOUT 215 are higher than VREF1, the secondary loop turns on the low side device 222 and one end of the capacitor 218 is pulled to ground and since the other end of the capacitor is connected to VOUT 215, the capacitor charges to the voltage at VOUT. At time point A in the waveform 403, the load increases to 2 Amps causing voltage at VOUT 215 to go down. The secondary loop 224 senses this, turns off the device 222 and starts pulling-up its output 220 (shown in waveform 404) via device 221 connected to VIN 223. Since the output 220 is coupled to VOUT through the capacitor 218, the increase in the voltage at 220 causes VOUT 215 voltage to go up as well (supplying current $I_{SUP}$). As can be seen in the waveform 405 for voltage at VOUT, VOUT quickly recovers to the minimum needed voltage of 3.5V from 3.45V as compared to 3V in the waveform 304. Thus, the secondary loop 224 prevents the system from collapsing by regulating VOUT 215 voltage to the minimum required voltage without causing significant drop in the voltage when the load transient event occurs.

Meanwhile, the boost regulator 209 is enabled and ramps up its output current $I_{SW1}$ 212 so that it can supply the entire needed load current. As can be seen in FIG. 2, when VREF1=VREF both the boost regulator 209 and secondary loop 224 are comparing VOUT (201 and 226) and VREF signals (206 and 227) to generate the proper VOUT 215 voltage. Since for steady state operation, the boost regulator 209 is more efficient, it is desirable to put the secondary loop 224 in a standby monitoring mode, where it is still monitoring VOUT 215 for any sudden drops in voltage but unless VOUT drops it is not providing any current to the load at VOUT 215.

In one embodiment, a way to implement he secondary loop 224 in a standby monitoring mode is to slightly adjust the VREF1 227 signal going into comparator 225. Thus, when the boost regulator 209 current has ramped up (and the voltage), the VREF1 signal 227 input to the shunt loop 224 is decreased by a small amount ΔV, such that boost regulator 209 is regulating VOUT at a voltage equal to VREF, whereas the secondary loop 224, since VOUT 226 now is regulated to VREF and is higher than its new decreased reference input VREF1=VREF−ΔV, turns off the current source device 221 (which is connected to VIN 223) and turns on the low side device 222 and pulls one side 220 of the capacitor 218 to ground and this recharges the capacitor back to VOUT voltage and the secondary loop 224 stays in this standby mode until a transient event at VOUT 204 causes VOUT to drop below VREF1=VREF−ΔV. When this happens, the loop 224 turns off the device 222 and starts to provide sourcing current to VOUT by turning on the device 221 and prevents VOUT from dropping below VREF1=VREF−ΔV. Boost regulator 209 responds to this transient event at a slower speed, eventually bringing back the VOUT level back to VREF from VREF1=VREF−ΔV and the above cycle repeats.

The input 227 of shunt loop 224 VREF1 could just be held at VREF1=VREF−ΔV all the while rather than swapping between VREF1=VREF and VREF1=VREF−ΔV. If it is held constant at VREF1=VREF−ΔV, VOUT 215 would drop by an additional ΔV in the transient event which decreases the power supply 200 efficiency by a little amount as now the VOUT 215 needs to be regulated higher in steady state with the added margin of ΔV. If the voltage 227 VREF1 is desired to be swapped between two levels VREF1=VREF and VREF1=VREF−ΔV, an input 230 to the shunt loop 224 which controls the value of the input 227 VREF1, whether it is VREF1=VREF or VREF1=VREF−ΔV, could be the EN 210 output of the battery voltage sense comparator 229, with 227 VREF1 held at VREF as long as the battery VBAT 204 is supplying the load and when battery voltage drops low, EN 210 goes high and boost regulator 209 starts to supply load. When the EN 210 goes high, there is typically some delay before boost regulator 209 can ramp up its output current to provide the required load and starts to regulate VOUT. This delay is typically determined by the bandwidth of the boost regulator. Thus when EN 210 goes high, the input 227 VREF1 could be switched back to VREF1=VREF−ΔV after a short delay (typically 5 μs-20 μs as an example) based on the bandwidth of the boost regulator 209. In addition, it may be desirable to change the input 227 VREF1 to VREF1=VREF when the load current $I_{Load}$ 217 at VOUT 215 is expected to increase. As an example, if the load 216 is a radio frequency power amplifier and when the power amplifier is starting to transmit a signal, a baseband chip or the RF power amplifier could send a signal to the power supply 200 of imminent load increase. The shunt loop 224 could then take this input and change the input 227 VREF1 to VREF from VREF−ΔV, and keep it at that level for a short time based on the expected delay in the boost regulator 209 response time.

Since the secondary loop 224 can regulate VOUT 215 at VREF1=VREF−ΔV voltage until the boost regulator 209 responds and VOUT would have fallen much lower than VREF−ΔV if the secondary loop 224 was not present, in order to speed up the response of the boost regulator 209 such that it provides the load current faster as it is more efficient than the secondary loop 224, it may be desirable to decrease a feedback signal 228 based on VOUT 201 via, for example, resistor 205 for the boost regulator 209 by an amount proportional to the current sourced $I_{SUP}$ 220 by the secondary loop 224. As shown in FIG. 2, the current $I_{SUP}$ sourced by the loop 224 is sensed at 219 ISENSE, this sensed current (typically a smaller fraction of the current $I_{SUP}$) creates a drop across resistor 215, such that the feedback input 228 to the boost regulator 209 is lower than the VOUT 201 voltage. Because of this, the difference in voltage of the two control inputs VREF 206 and VREF1 227 is higher, causing the boost regulator 209 to respond faster when the shunt loop 224 is sourcing current.

As explained in the operation of the power supply 100, coupling the shunt loop 224 output 220 to VOUT 215 through the capacitor 218 is critical for the operation of this power supply. If the secondary loop 224 output were directly coupled to VOUT, then the input supply VIN 223 of the source device 221 would need to be higher than the voltage at VOUT 215. Since the voltage at VOUT needs to be regulated higher than the battery voltage VBAT 204, to make VIN 223 voltage higher than VOUT would need an additional boost regulator thus increasing the system cost. In addition, as explained in the description of the power supply 100, sourcing current from a higher voltage supply is not as efficient as sourcing current from a lower voltage. With the use of the coupling capacitor 218, the voltage at VIN 223 could be as low as, for example, 1V as explained in the description of the power supply 100. Thus, VIN 223 could just be connected to the battery voltage VBAT 204 decreasing the system cost.

The boost regulator 209 could be replaced with a buck-boost regulator, which steps down a battery voltage VBAT when the battery voltage is higher than VREF and steps up the VBAT voltage when VBAT is less than VREF. In this case, the parallel path from the VBAT 204 to VOUT 215 through node 213 could be eliminated and the power supply of 200 becomes similar to the Power Supply 100 with the regulator 101 being the buck-boost regulator.

Figure 5:
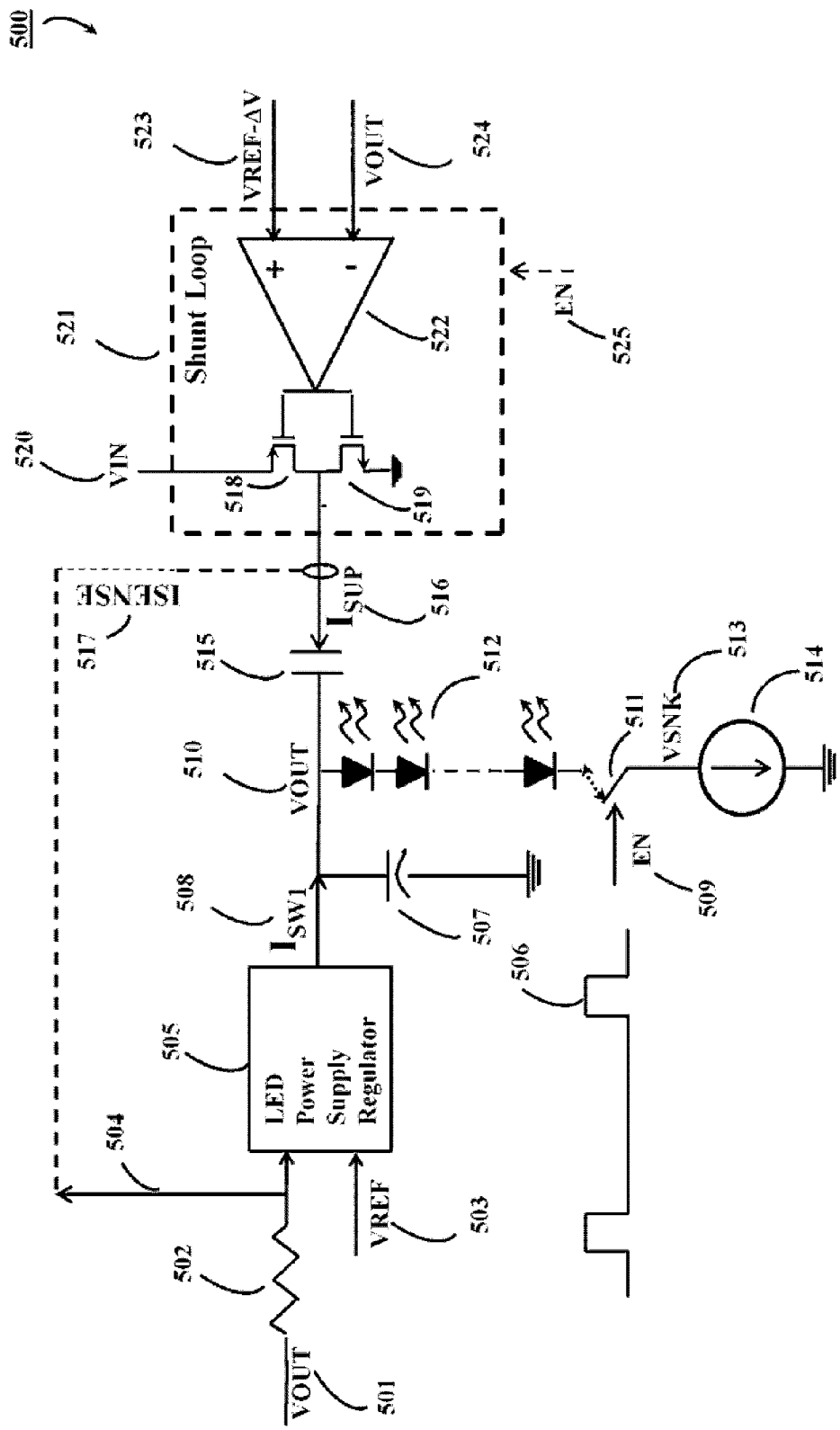
FIG. 5 illustrates an application using one embodiment of the invention.

FIG. 5 shows, generally at 500, another embodiment of the inventions showing a power supply. The operation of power supply 500 is similar to the operation of the power supply 200. The boost regulator 209 is now replaced with a LED power supply regulator 505 (also called a primary regulator) which could be a step-up, step down, buck-boost regulator, etc. and the load 512 is a string of light emitting diodes (LEDs). When the switch 511 is closed, the current 514 is passed through the LEDs, which makes them illuminate. One method of controlling the LED brightness is by applying a pulse width modulated (PWM) signal for dimming. The signal 506 applied as enable signal 509 to the switch 511 is a pulse width modulated signal; when it is high, the switch 511 is closed allowing the current to pass through LEDs 512 and when it is low, the switch 511 is open and there is no current through the LEDs 512. The brightness of the LEDs 512 depends on the average current through them, which in turn is equal to the current 514 multiplied by the duty cycle (ratio of time duration when the signal is high to the time period of the signal) of the PWM signal 506. Thus, by controlling the duty cycle of the PWM signal 506, the LEDs 512 can be dimmed. The limiting factor to get a wide range of dimming is that the duty cycle cannot be made too small as if it is made smaller the LED current turn on time is smaller and the LED power supply 505 cannot ramp up the current $I_{SW1}$ at its output 508 fast enough to provide required LED current due to its limited slow response resulting in non-linear dimming when the dimming duty cycle is reduced. As explained in detail for the power supplies of 100 and 200, the presence of the shunt loop 521 (also called secondary regulator) in parallel with its output 516 coupled to VOUT 510 through the capacitor 515 helps in achieving a faster response in regulating VOUT 510 to the required voltage and provides the needed current to the LEDs 512 even for smaller duty cycles, thus achieving a wider dimming range for the LEDs' 512 brightness.

As explained with reference to the power supply 200, the reference input 523 of the loop 521 could be changed between two reference levels VREF and VREF−ΔV (illustrated only as VREF−ΔV in FIG. 5) so that the shunt loop 521 is only active during a transient event and is in monitoring mode while in steady state. The LED current enable PWM dimming signal 506 could be used to change the reference level to reference input 523. When the signal 506 is high, the LED current is turned on as the switch 511 closes thus presenting a load transient at VOUT 510. To regulate VOUT 510 faster with minimized drop in voltage, the input 523 could be changed to the higher voltage VREF (could be same in value as the reference input VREF 503 of the LED power supply regulator 505). Similar to the power supply 200, the input 523 could be held high as long as the LED current enable signal 506 is high or could be turned lower to VREF−ΔV a fixed time duration after signal 506 goes high. This fixed duration depends on the expected response time of the regulator 505. This switching of the reference level at 523 could be controlled by enable signal EN 525 which is connected to EN 509 and triggered by signal 506.

In addition, similar to the power supply 200, the output feedback and sense voltage input 501 could be decreased in proportion to the load being supplied by the shunt loop 521 by means of the current sense signal 517 ISENSE to improve the response time of the LED power supply regulator 505. The resistor 502 would decrease the input 504 to the LED power supply regulator 505

Similar to the power supplies 100 and 200, the inclusion of the capacitor 515 to couple the shunt loop 521 output to the VOUT 510, eliminates the need for the input voltage VIN 520 of the shunt loop 521 to be higher than the voltage at VOUT 510.

508 represents the LED power supply regulator 505 output current $I_{SW1}$. 513 VSNK denotes the voltage at the current sink 514. 524 denotes an input to comparator 522 which drives high side device 518 and low side device 519 the junction of which is 516 supplying $I_{SUP}$.

Figure 6:
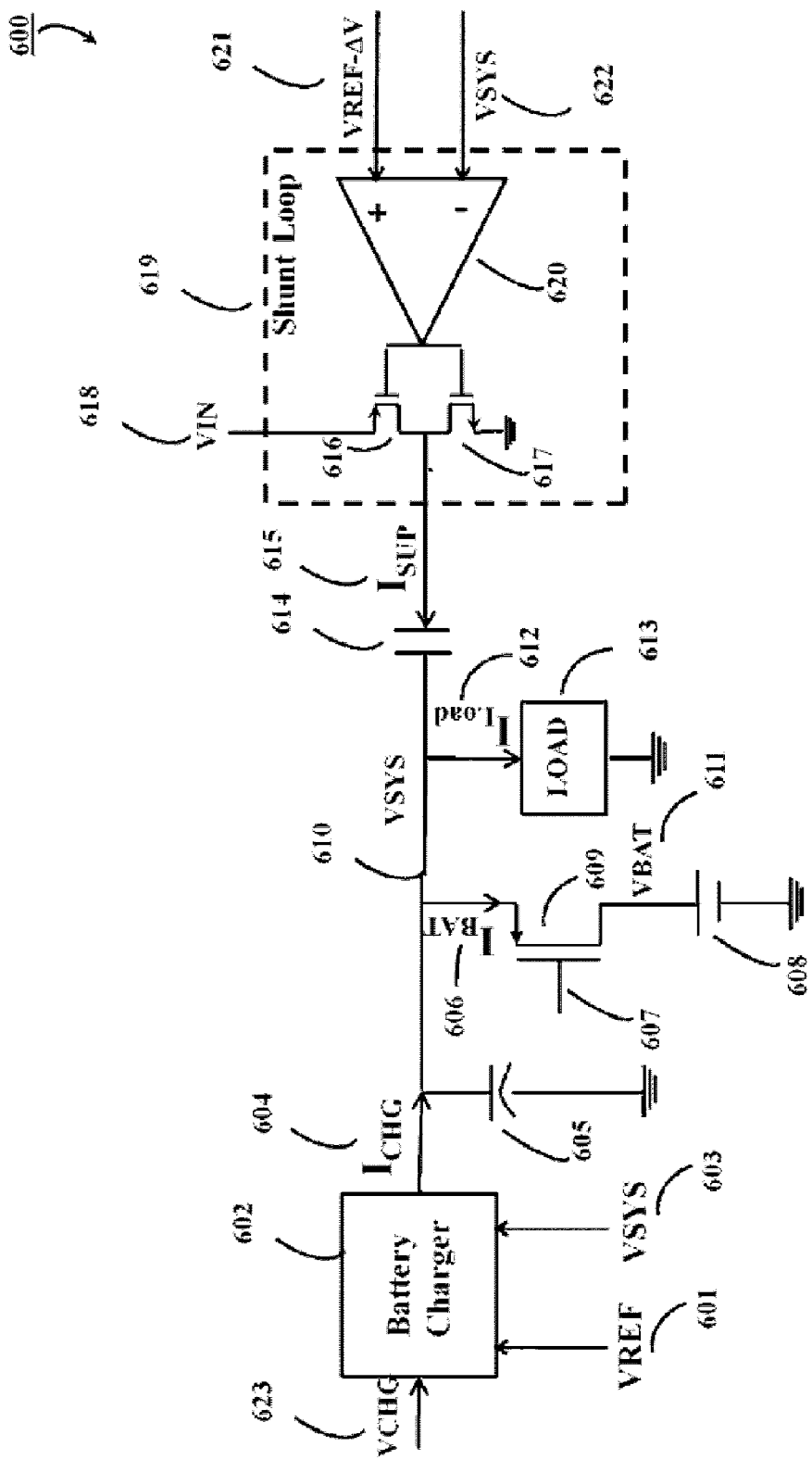
FIG. 6 illustrates an application using one embodiment of the invention.

FIG. 6 shows, generally at 600, a power supply embodiment of the invention. In the power supply 600, the primary loop is the battery charger 602 (also called primary regulator). This primary loop takes the VCHG voltage 623 as input and regulates its output VSYS 610 with a current $I_{CHG}$ 604. In addition, it also provides the charging current $I_{BAT}$ 606 to the battery 608 by regulating gate voltage 607 of transistor 609. The voltage on battery 608 is denoted VBAT 611. The LOAD 613 may consist of a power management integrated circuit (PMIC) consuming a current of $I_{Load}$ 612 which contains several regulators; these regulators take VSYS 610 as input and generate several output voltages (not illustrated in FIG. 6) suitable to power the electronic devices in the system.

These electronic devices with rapidly changing loads provide severe load transients at VSYS 610. Typically, the battery charger 602 is optimized for battery charging and has limited bandwidth to respond to fast transients at its output VSYS 610. The drop in voltage at VSYS 610 due to the load transients may make the system malfunction or operation collapse.

The operation of the power supply 600 is similar to that of the power supplies 100, 200 and 500. The shunt loop 619 (also called secondary regulator), which is optimized for faster response, with its output 615 (and current $I_{SUP}$) coupled to VSYS 610 in parallel through the capacitor 614, prevents VSYS 610 from dropping by providing needed current $I_{SUP}$ 615 under load transient conditions. The battery charger 602 takes additionally as inputs VREF 610 and VSYS 603. Shunt loop 619 has comparator 620 inputs 622 VSYS and in the shown embodiment in FIG. 6 a reference input at 621 of VREF−ΔV. ΔV can vary from 0V to some predetermined voltage. Comparator 620 drives low side device 617 and high side device 616. High side device 616 is coupled to VIN 618.

Thus various embodiments and applications of the present invention have been illustrated and described, it is to be understood that the invention is not limited to the precise construction and components disclosed herein As an example, there are several ways to implement the output sense feedback networks. The output VOUT sense in 114, 201, 226, 501, 524, 603, 622 for the power supplies 100, 200, 500, and 600 respectively could just be a direct electrical connection to the output 104, 215, 510, and 610 or could include a resistor divider network from VOUT to ground with the sense signals coming from the divided down version of the output. In addition, capacitors could be added in parallel with the resistor network to shape the frequency response of the loop.

Similarly, there are several ways to implement the offset ΔV in the reference signals 523 and 621 with respect to the signals 503 and 601. As an example, the input differential pair of the amplifier 522 could have devices with slightly different widths connected to the positive and negative inputs thus resulting in the offset ΔV in the reference signal VREF. As an additional example, the signal VREF and VREF−ΔV could be generated from a common reference signal with a resistor divider network connected to the common reference signal and the VREF and VREF−ΔV signals are generated by using different taps from the resistor divider network.

While not germane to the operation or techniques disclosed, one of skill in the art will appreciate that the devices types of devices, for example, as shown at 109, 118, 211, 221, 222, 518, 519, 609 and 616 may be fabricated in different polarities as well as technology types, for example, but not limited to CMOS (complementary metal oxide semiconductor (MOS)) devices, Bipolar devices, DMOS (double diffused MOS) devices, NMOS (n-type MOS), PMOS (p-type MOS) devices, etc. Additionally the power systems of the present invention can be implemented in CMOS, BiCMOS (bipolar CMOS), BCD (BiCMOS and Bipolar, CMOS and DMOS), GaAs (gallium arsenide), GaN (Gallium nitride), SOI (silicon on insulator), or other processes.

Additionally, while light emitting diodes (LEDs) were described above, one of skill in the art will appreciate that other light emitting devices are possible, such as but not limited to solid state lasers, diode lasers, nanotubes, etc.

In addition, the energy storage capacitors 103, 214, 507, and 605 of the power supplies 100, 200, 500 and 600 are optional and they could be eliminated or made smaller as the coupling capacitors 107, 218, 515, and 614 respectively serve as energy storage capacitors as well.

Figure 7:
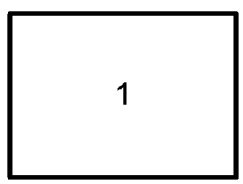
FIG. 7 illustrates various embodiments of the invention.
Figure 7:
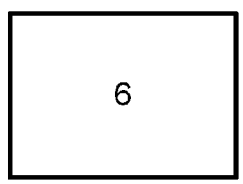
Figure 7:
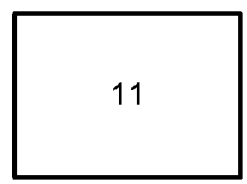
Figure 7:
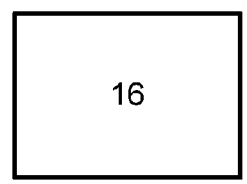
Figure 7:
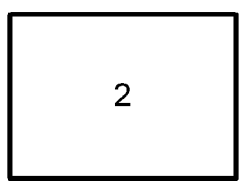
Figure 7:
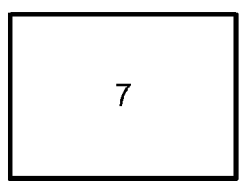
Figure 7:
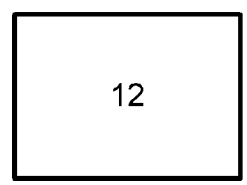
Figure 7:
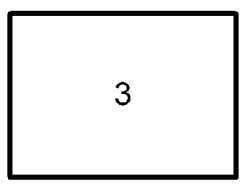
Figure 7:
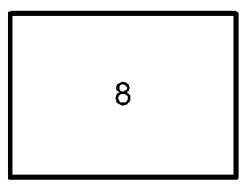
Figure 7:
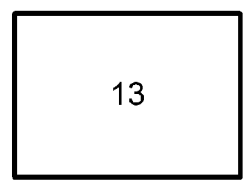
Figure 7:
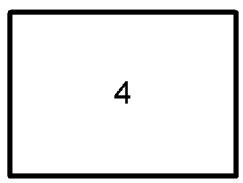
Figure 7:
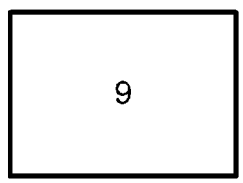
Figure 7:
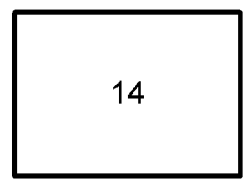
Figure 7:
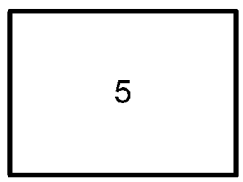
Figure 7:
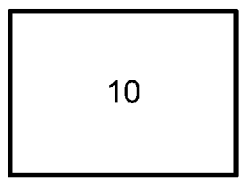
Figure 7:
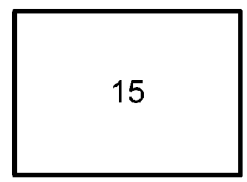

FIG. 7 illustrates various embodiments of the invention as indicated below.

Illustrated generally at box 1. A power supply comprising: a primary regulator with a first frequency response and a first output; a secondary regulator with a faster frequency response than said first frequency response and a second output; and wherein said second output is coupled in parallel with said first output through a capacitor to provide a combined output.

Illustrated generally at box 2. The power supply of box 1 wherein said first regulator in a steady state provides all current at said combined output, and wherein said secondary regulator only provides a supplemental current to said combined output when a voltage at said combined output falls to a lower transient value.

Illustrated generally at box 3. The power supply of box 2 wherein a threshold level of said lower transient value at which said second regulator provides said supplemental current is made higher momentarily when a load attached to said combined output is increased.

Illustrated generally at box 4. The power supply of box 2 wherein said first regulator has a feedback input from said combined output to regulate a voltage at said combined output and said feedback input is made lower in proportion to an amount of current being sourced by said second regulator to said combined output.

Illustrated generally at box 5. The power supply of box 1 wherein an input power source voltage for powering said second regulator is less than said voltage at said combined output Illustrated generally at box 6. A power supply comprising: a direct current (DC) power source having a first output; a boost regulator having a first frequency response and a second output; a second regulator with a higher frequency response than said first frequency response and a third output; and wherein said first output and said second output are coupled in parallel to provide a combined output and wherein said third output is coupled in parallel to the said combined output through a capacitor.

Illustrated generally at box 7. The power supply of box 6 wherein said DC power source supplies an entire current load at said combined output when a voltage of said first output is higher than a first threshold, and wherein said boost regulator provides all steady state load current at said combined output when said voltage of said first output is lower than said first threshold, and wherein said second regulator only provides a supplemental current to said combined output when a voltage at said combined output falls to a lower transient value Illustrated generally at box 8. The power supply of box 6 wherein an input power source voltage for powering said second regulator is less than a voltage at said combined output.

Illustrated generally at box 9. A light emitting device power supply comprising: a primary regulator having a first frequency response and a first output; a secondary regulator with a higher frequency response than said first frequency response and a second output; and wherein said second output is coupled in parallel with said first output through a capacitor to provide a combined output which provides power to one or more light emitting devices.

Illustrated generally at box 10. The power supply of box 9 wherein said primary regulator provides all steady state load current at said combined output, and wherein said second regulator only provides a supplemental current to said combined output when a voltage at said combined output falls to a lower transient value.

Illustrated generally at box 11. The power supply of box 9 wherein said primary regulator provides all steady state load current at said combined output; and wherein a current through said light emitting devices connected at said combined output is enabled and disabled periodically, and wherein said second regulator only provides a supplemental current to said combined output for a short time periodically when said current through said light emitting devices is enabled.

Illustrated generally at box 12. The power supply of box 9 wherein an input power source voltage for powering said second regulator is less than a voltage at said combined output.

Illustrated generally at box 13. A power supply consisting: a battery charger having a first frequency response and a first output; a second regulator with a higher frequency response than said first frequency response and a second output; wherein said second output is coupled in parallel with said first output through a capacitor to provide a combined output; and wherein said battery charger provides a battery charging current to a battery coupled to said combined output, and wherein said battery charger regulates a voltage at said combined output.

Illustrated generally at box 14. The power supply of box 13 wherein said second regulator only provides a supplemental current to said combined output when said voltage at said combined output falls to a lower transient value.

Illustrated generally at box 15. The power supply of box 13 wherein said battery charger has a feedback input from said combined output to regulate said voltage at said combined output and said feedback input is made lower in proportion to an amount of current being sourced by said second regulator to said combined output.

Illustrated generally at box 16. The power supply of box 13 wherein an input power source voltage for powering said second regulator is less than said voltage at said combined output.

Thus a method and apparatus for power supply with fast transient response have been described.

Because of the high speeds and noise considerations in embodiments of the present invention (for example, power supply variations) specialized hardware is required.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus while particular embodiments and applications of the present invention have been illustrated and described, it is to be understood that the invention is not limited to the precise construction and components disclosed herein. Various modifications, changes and variations which will be apparent may be made in the arrangement, operation and details of the method and apparatus of the present invention disclosed herein without departing from the spirit and scope of the invention as defined in the claims.

What is claimed is:

1. A power supply comprising:
   a primary regulator with a first frequency response and a first output;
   a secondary regulator with a faster frequency response than said first frequency response and a second output;
   wherein said second output is coupled in parallel with said first output through a capacitor to provide a combined output;
   wherein said primary regulator in a steady state provides all current at said combined output, and wherein said secondary regulator only provides a supplemental current to said combined output when a voltage at said combined output falls to a lower transient value; and
   wherein a voltage on said capacitor in steady state depends on at least in part on a voltage level at said combined output.

2. The power supply of claim 1 wherein a threshold level of said lower transient value at which said second regulator provides said supplemental current is made higher momentarily when a load attached to said combined output is increased.

3. The power supply of claim 1 wherein said first regulator has a feedback input from said combined output to regulate a voltage at said combined output and said feedback input is made lower in proportion to an amount of current being sourced by said second regulator to said combined output.

4. The power supply of claim 1 wherein an input power source voltage for powering said second regulator is less than said voltage at said combined output.

5. A power supply comprising:
   a direct current (DC) power source having a first output;
   a boost regulator having a first frequency response and a second output;
   a second regulator with a higher frequency response than said first frequency response and a third output;
   wherein said first output and said second output are coupled in parallel to provide a combined output and wherein said third output is coupled in parallel to the said combined output through a capacitor;
   wherein said DC power source supplies an entire current load at said combined output when a voltage of said first output is higher than a first threshold, and wherein said boost regulator provides all steady state load current at said combined output when said voltage of said first output is lower than said first threshold,
   wherein said second regulator only provides a supplemental current to said combined output when a voltage at said combined output falls to a lower transient value; and
   wherein a voltage on said capacitor in steady state depends on at least in part on a voltage level at said combined output.

6. The power supply of claim 5 wherein an input power source voltage for powering said second regulator is less than a voltage at said combined output.

7. A light emitting device power supply comprising:
   a primary regulator having a first frequency response and a first output;
   a secondary regulator with a higher frequency response than said first frequency response and a second output;
   one or more light emitting devices;
   wherein said second output is coupled in parallel with said first output through a capacitor to said one or more light emitting devices;
   wherein said primary regulator provides all steady state load current at said one or more light emitting devices, and wherein said second regulator only provides a supplemental current to said one or more light emitting devices when a voltage at said one or more light emitting devices falls to a lower transient value; and
   wherein a voltage on said capacitor in steady state depends on at least in part on a voltage level at said one or more light emitting devices.

8. The light emitting device power supply of claim 7 wherein said primary regulator provides all steady state load current at said one or more light emitting devices; and
   wherein a current through said one or more light emitting devices is enabled and disabled periodically, and wherein said second regulator only provides a supplemental current to said one or more light emitting devices for a short time periodically when said current through said one or more light emitting devices is enabled.

9. The light emitting device power supply of claim 7 wherein an input power source voltage for powering said second regulator is less than a voltage at said one or more light emitting devices.

10. A power supply comprising:
    a battery charger having a first frequency response and a first output;
    a second regulator with a higher frequency response than said first frequency response and a second output;
    wherein said second output is coupled in parallel with said first output through a capacitor to provide a combined output;
    wherein said battery charger provides a battery charging current to a battery coupled to said combined output, and wherein said battery charger regulates a voltage at said combined output;
    wherein said second regulator only provides a supplemental current to said combined output when a voltage at said combined output falls to a lower transient value; and
    wherein a voltage on said capacitor in steady state depends on at least in part on a voltage level at said combined output.

11. The power supply of claim 10 wherein said battery charger has a feedback input from said combined output to regulate said voltage at said combined output and said feedback input is made lower in proportion to an amount of current being sourced by said second regulator to said combined output.

12. The power supply of claim 10 wherein an input power source voltage for powering said second regulator is less than said voltage at said combined output.

* * * * *